(12) United States Patent
Sinnamohideen et al.

(10) Patent No.: US 12,547,496 B1
(45) Date of Patent: Feb. 10, 2026

(54) REDUCED DATA STORED IN INTENT LOGS OF STORAGE SYSTEMS

(71) Applicant: VDURA, Inc., San Jose, CA (US)

(72) Inventors: Shafeeq Sinnamohideen, Pittsburgh, PA (US); Ian Davies, Longmont, CO (US); Michael Barrell, Longmont, CO (US)

(73) Assignee: VDURA, Inc., San Jose, CA (US)

( * ) Notice: Subject to any disclaimer, the term of this patent is extended or adjusted under 35 U.S.C. 154(b) by 0 days.

(21) Appl. No.: 19/097,694

(22) Filed: Apr. 1, 2025

(51) Int. Cl.
| | |
|---|---|
| *G06F 12/00* | (2006.01) |
| *G06F 11/10* | (2006.01) |
| *G06F 12/02* | (2006.01) |
| *G06F 12/0866* | (2016.01) |
| *G06F 12/0868* | (2016.01) |
| *G06F 12/0888* | (2016.01) |

(52) U.S. Cl.
CPC .......... *G06F 11/1088* (2013.01); *G06F 12/00* (2013.01); *G06F 12/02* (2013.01); *G06F 12/0238* (2013.01); *G06F 12/0866* (2013.01); *G06F 12/0868* (2013.01); *G06F 12/0888* (2013.01)

(58) Field of Classification Search
None
See application file for complete search history.

(56) References Cited

U.S. PATENT DOCUMENTS

| | | | |
|---|---|---|---|
| 2008/0005510 A1* | 1/2008 | Sepe | G06F 11/1433 711/162 |
| 2010/0031246 A1* | 2/2010 | Meller | G06F 8/654 717/173 |
| 2016/0077962 A1* | 3/2016 | Ehrlich | G06F 12/0246 711/103 |

* cited by examiner

*Primary Examiner* — Midys Rojas
(74) *Attorney, Agent, or Firm* — Fenwick & West LLP (57) ABSTRACT

A storage system stores data on a persistent storage device and intent log on a high performance persistent storage device. The storage system receives requests to write data and in response, writes the data to the persistent storage device. The storage system receives a request to write data and a request to read data before the write request is processed. The storage system determines whether the data being read by the read request overlaps the data being written by the write request. If the data being read overlaps the data being written, the storage system writes the data being written in the intent log stored on the high performance persistent storage device. Subsequent to storing the data in the intent log on the high performance persistent storage device, the storage system sends the data being read to the client that sent the read request.

20 Claims, 9 Drawing Sheets

REDUCED DATA STORED IN INTENT LOGS OF STORAGE SYSTEMS

BACKGROUND

1. Field of the Disclosure

The present disclosure relates to storage systems in general and more specifically to minimizing amount of data written to a fast storage device, for example, while writing an intent log in a storage system.

2. Description of the Related Art

Storage systems use intent logs to make file operations faster and more resilient to failures. The data stored in an intent log can be used to reduce repair time for data after a failure. The contents of the intent log are used in the event of unexpected failure, for example, a crash or power loss of the storage node. An intent log improves performance of the storage system since the storage system can acknowledge a write once the write is recorded in the intent log rather than wait for the data write to complete to backing media. The intent log is typically stored on a storage device with high performance. Such high performance storage devices typically have higher manufacturing costs and are expensive. This results in increase in the cost of the computer system as a whole. Less expensive storage devices have poor performance and can impact the overall performance of the read and write operations of the storage system.

SUMMARY

Embodiments concern reducing amount of data stored in intent logs of file systems. A storage system stores data on a persistent storage device and intent log on a high performance persistent storage device that has faster performance compared to the persistent storage device. The high performance persistent storage device has a lifetime limit of total bytes written. Embodiments reduce the amount of data that is written to the intent log by writing data only for write requests for which the data being written overlaps the data being read by a concurrent read request.

The storage system receives requests to write data and in response, writes the data to the persistent storage device. The storage system receives a request to write data and a request to read data before the write request is processed. The storage system determines whether the data being read by the read request overlaps the data being written by the write request. If the data being read overlaps the data being written, the storage system writes the data being written in the intent log stored on the high performance persistent storage device. Subsequent to storing the data in the intent log on the high performance persistent storage device, the storage system sends the data being read to the client that sent the read request.

According to an embodiment, the steps described herein are executed as a process. According to an embodiment, a non-transitory computer readable storage medium comprising stored program code including instructions that when executed by one or more computer processors, cause the one or more computer processors to perform the steps of the methods described herein. Other embodiments include computer systems that include one or more processors and a non-transitory computer readable storage medium comprising stored program code including instructions that when executed by the one or more computer processors, cause the one or more computer processors to perform the steps of the methods described herein.

BRIEF DESCRIPTION OF THE DRAWINGS

The teachings of the embodiments can be readily understood by considering the following detailed description in conjunction with the accompanying drawings.

The Figures (FIG.) and the following description relate to preferred embodiments by way of illustration only. It should be noted that from the following discussion, alternative embodiments of the structures and methods disclosed herein will be readily recognized as viable alternatives that may be employed without departing from the principles of the embodiments.

Reference will now be made in detail to several embodiments, examples of which are illustrated in the accompanying figures. It is noted that wherever practicable, similar or like reference numbers may be used in the figures and may indicate similar or like functionality. The figures depict embodiments for purposes of illustration only.

DETAILED DESCRIPTION

A storage system maintains an intent log for faster storge of data in parallel with the data being stored on a slower persistent storage device such as a hard disk drive (HDD). The storage uses the content of the intent log in the event of unexpected failure, for example, system crash or power loss of the storage node. The intent log is stored on a high performance persistent storage device such as an NVDIMM (non-volatile dual in-line memory module) or a solid state device (SSD). A persistent storage device such as an NVDIMM allows unlimited number of writes over the lifetime of the NVDIMM but is expensive compared to storage devices such as SSDs. However persistent storage devices such as SSDs have a lifetime limit on the amount of data written such that the storage device has a higher likelihood of failures after the amount of data stored on the storage device during its lifetime exceeds that limit. As a result, the storage system reduces the amount of data that is written to the intent log.

Accordingly, the storage system according to various embodiments performs efficient writes while minimizing the amount of data written to the intent log. The storage system does not store data being written for all write requests received. The storage system selectively determines whether to store the data being written to the intent log, thereby reducing the amount of data that is stored in the intent log. For example, the storage system writes the data received as part of a write request to the intent log if a read request is received for data that overlaps the data being written as a result of the write request. However if there is no read request for data that overlaps the data being written, the storage system writes the data received as part of the write request directly to a persistent storage device such as HDD instead of storing the data in the intent log. Since the likelihood of receiving a read request for data overlapping the data being written is low, the amount of data written by a storage system in accordance with the disclosed embodiments is significantly lower than the amount of data written by a storage system that writes data of every write request received to the intent log. Therefore, the techniques disclosed herein ensure that the storage device used for storing the intent log has longer lifetime and as a result the storage system has longer lifetime without significantly compromising on the performance of the data access operations such as read and write operations.

According to an embodiment, the system implements a parallel file system uses that multiple storage nodes and performs parallel and redundant access to data storage nodes to deliver high performance data access with scalability and reliability. The PFS uses a storage system that includes multiple storage nodes (also referred to as servers) and storage devices. Examples of storage devices include HDD (hard disk drive) and SSD (solid state drive.) The storage system is built as a resilient platform, such that when components fail, the system repairs itself to maintain availability and durability of the data. The components of the storage system that are most likely to fail are the storage devices (e.g., HDDs) on which most of the data is stored upon. Other components may also fail depending on their MTBF (mean time between failure)/AFR (annualized failure rate).

The storage system achieves following goals: (1) at the storage node level, the read data is consistent with the data that was last written, and (2) at the parallel file system level, the stripes are consistent with the latest data. Accordingly, the system achieves strong storage node level consistency, i.e., a storage node crash or reboot after a write has been acknowledged causes later reads (after the storage node recovers) to get data consistent with what was written earlier. The system also provides strong stripe level consistency, i.e., a stripe write that is interrupted by a power loss to all storage nodes or client failure can result in an inconsistent stripe. This can only occur in a very narrow time window and in this case the requesting client does not receive confirmation that the write completed. Furthermore, at most one stripe can be inconsistent.

The system according to various embodiment provides several advantages over conventional systems. The system allows use of lower cost SSDs. Given the small size of storage node metadata, there may be space left over in SSDs that can be used for object storage. The system has higher write throughput and sync operations such as fsync( ) are not needed as frequently to free up space, making it more likely that the data is already synchronized. The system has higher streaming throughput since an extra write is eliminated from the I/O path.

Figure 1:
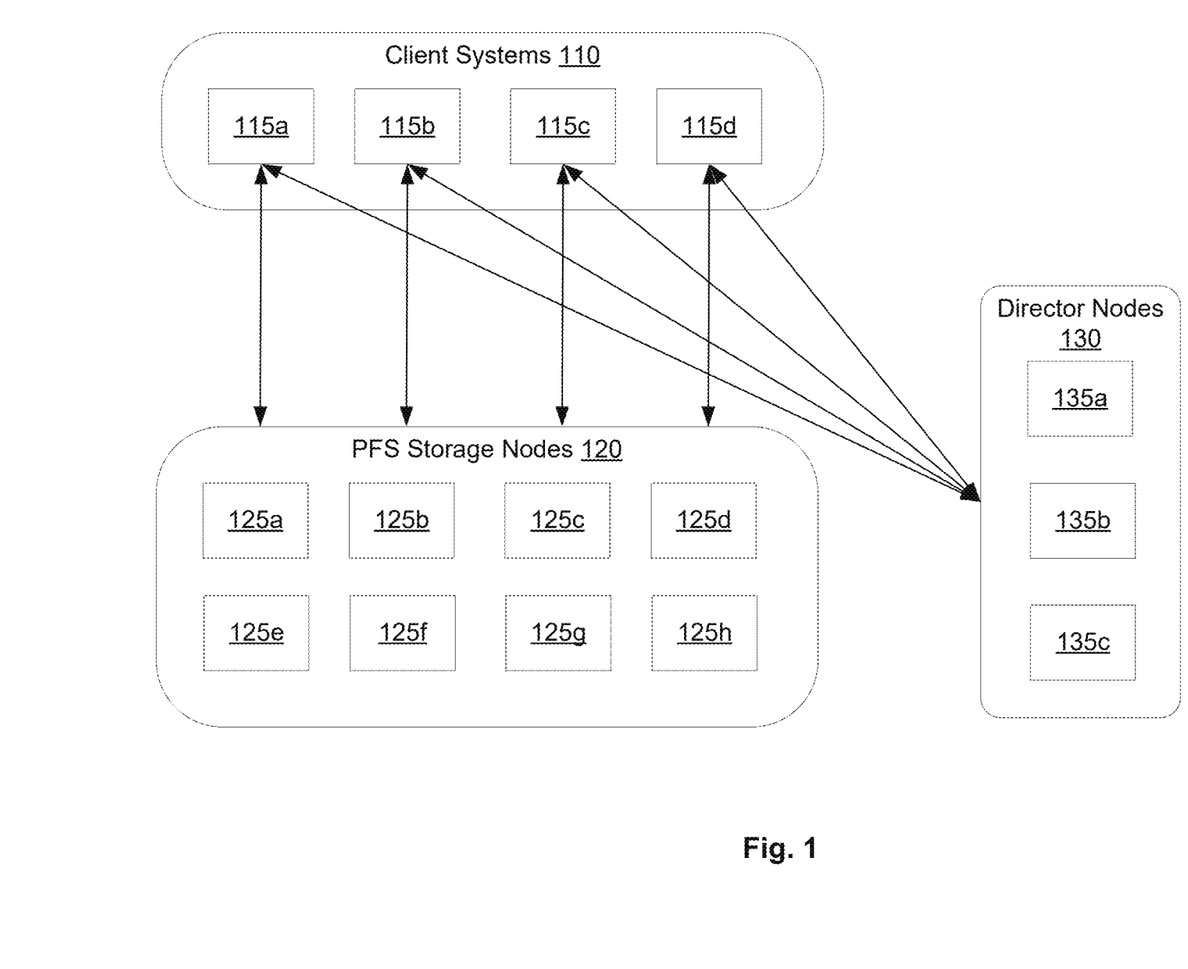
FIG. 1 illustrates the various components in the system environment of a parallel file system, according to an embodiment.

FIG. 1 illustrates the various components in the system environment of a PFS, according to an embodiment. The system environment of the PFS includes a set 110 of client systems 115*a*, 115*b*, 115*c*, 115*d*, a set 120 or storage nodes 125*a*, 125*b*, 125*c*, 125*d*, 125*e*, 125*f*, 125*g*, 125*h* and a set 130 of director nodes 135*a*, 135*b*, 135*c*. The director nodes 135 and storage nodes 125 are computer systems that run the parallel file system. A client system 115 includes a client driver that is a loadable software module that interacts with the director nodes and storage nodes to read and write the files stored by the parallel file system. Any required administration is performed via a graphical user interface (GUI) or call level interface (CLI) running on a director node 135. All the director nodes and storage nodes work together to provide a single file system namespace referred to as a realm.

According to an embodiment, the PFS separates the control plane from the data plane. The director nodes 135 in the PFS form the control plane. The director nodes 135 perform various tasks including caching and modifying file system metadata (e.g., directories, file attributes, access permissions, etc.), coordinating the actions of the storage nodes 125 and the client drivers for file accesses, managing membership status of director and storage nodes within the PFS storage cluster, and controlling all failure recovery and data reliability operations. According to an embodiment, director nodes 135 are commodity compute servers with a high-speed networking connection, significant DRAM capacity, and a persistent store for transaction logs.

Storage nodes in the PFS form the data plane. Storage nodes represent the component of the overall architecture that stores data or metadata. While director nodes serve and modify file system metadata, they use storage nodes to store the metadata. The client driver is a loadable file system that is installed on compute servers and used by application programs running on a client system like any other file system. The client driver works with the director nodes and storage nodes to deliver a POSIX-compliant and cache-coherent file system behavior. Each file stored by the PFS is individually striped across many storage nodes, allowing each component piece of a file to be read and written in parallel, increasing the performance of accessing each file. For each file that the application wants to access, the client driver on the client system communicates over the network directly to all the storage nodes that hold that file's data.

The PFS scales out both director nodes 135 and storage nodes 125. For any given configuration of the system, additional director nodes can be added for more metadata processing performance. Similarly additional storage nodes can be added for more capacity or more storage performance.

Figure 2:
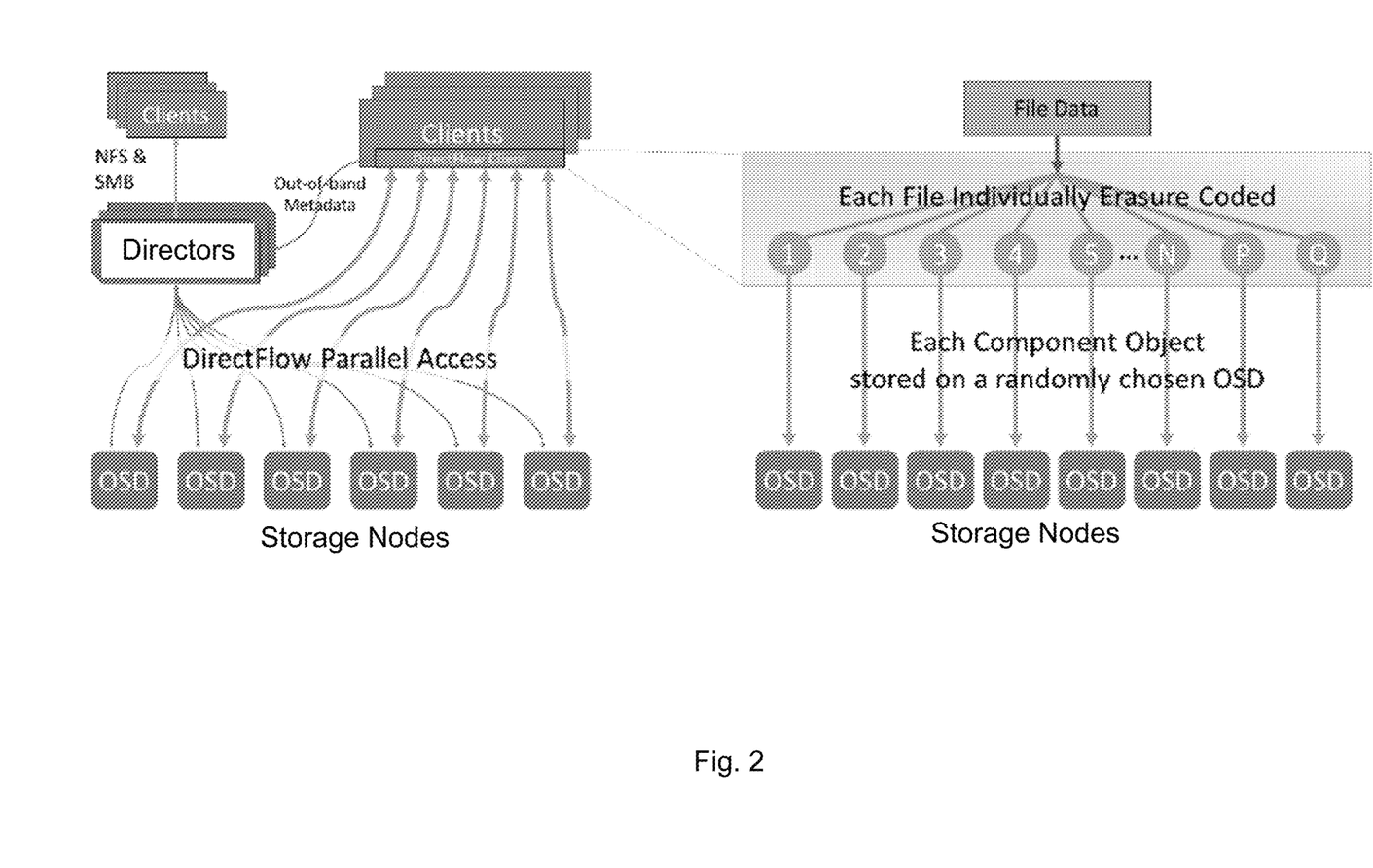
FIG. 2 illustrates how data is stored in a file in the parallel file system, according to an embodiment.

FIG. 2 illustrates how data is stored in a file in the parallel file system, according to an embodiment. The PFS uses multiple storage nodes by assigning a map to each file. The map for a file shows where all the striped component parts of that file are located, and which storage node holds each part. The client driver uses the map to determine which storage nodes to access, directly or in parallel. PFS uses network erasure coding as part of that striping to ensure data integrity and reliability.

The client driver provides the semantics of a locally-mounted, POSIX-compliant file system. The PFS ensures that if a process P2 (possibly on another compute server) is writing to a file at the same time the process P1 is reading from the file, this process P1 will not read stale data. Accordingly, PFS provides cache coherency across all the nodes running the client driver.

PFS performs random assignment of component objects to storage nodes to spread the load from file accesses across all those nodes. Typically, the number of storage nodes is much larger than the typical stripe width of a file. As a result, each file is very likely to only share a few storage nodes with any other files. This reduces the odds of any one storage node becoming overloaded and impacting the performance of the whole realm. As a result, the PFS provides a consistent system performance.

According to an embodiment, the PFS performs active capacity balancing to maintain consistent system performance. If the system load balance is off by more than a threshold, for example, if many files are deleted at once and a storage node is significantly less utilized compared to others, the director nodes examine utilization of all the storage nodes and transparently move component objects from over-loaded storage nodes to underutilized storage nodes.

Figure 3:
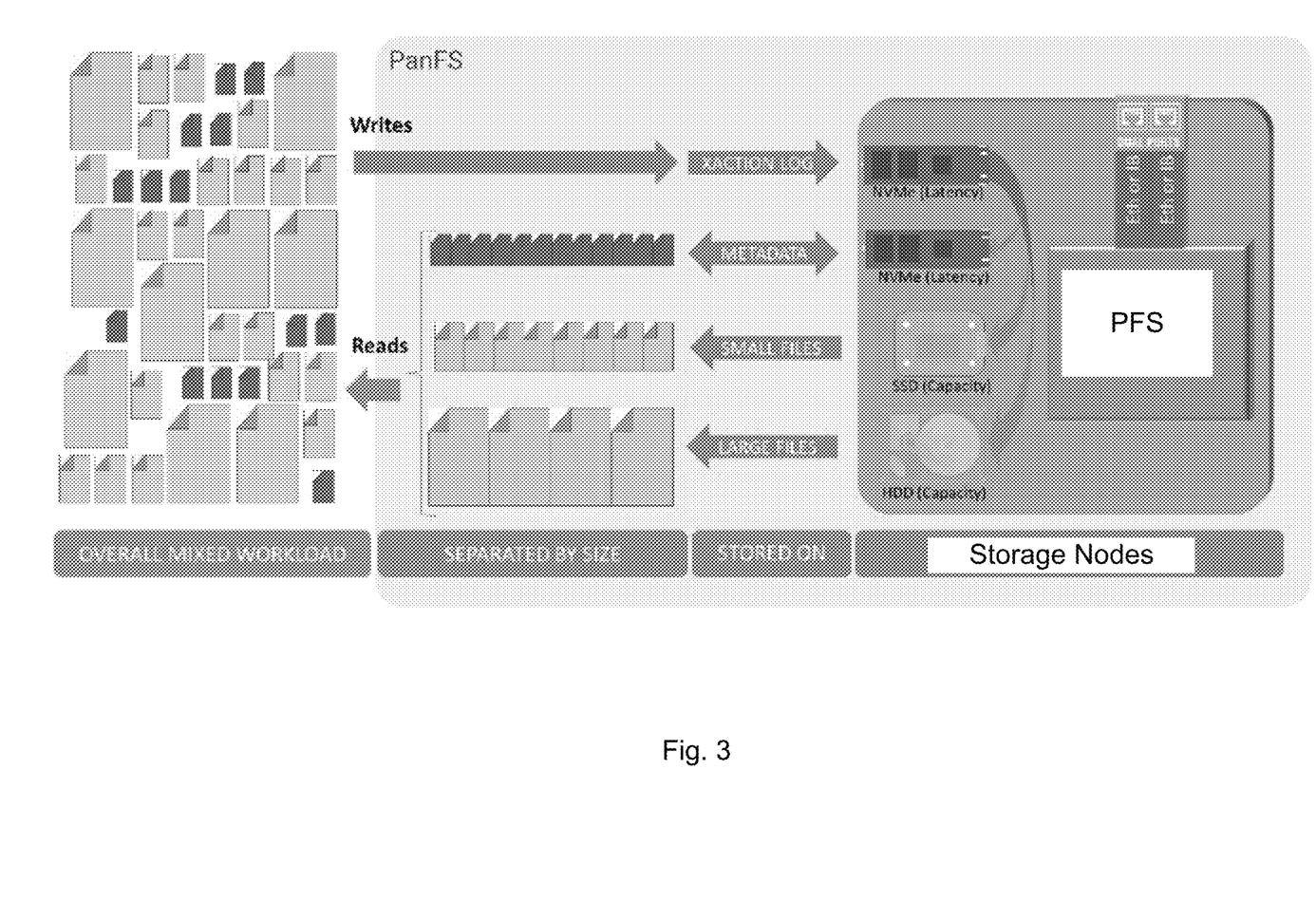
FIG. 3 illustrates the operation of storage nodes of the parallel file system, according to an embodiment.

FIG. 3 illustrates the operation of storage nodes of the PFS, according to an embodiment. The PFS architecture provides performance and reliability advantages as well as significant performance optimizations using the storage node software to enable efficient use of the available storage media inside each storage node. The PFS storage node handles multiple performance tiers of storage. According to an embodiment, the different performance tiers of a storage node include including storage class memory such as CXL (Compute Express Link's) persistent memory, latency optimized NVMe (non-volatile memory express) SSDs (solid state drives), capacity optimized SSDs, and HDDs (hard disk drives).

The storage node separates the storage of metadata from the storage of data. Metadata is usually composed of very small records that are accessed in unpredictable patterns and are typically latency sensitive. Directories are also metadata and are latency sensitive, that is often accessed sequentially. As a result of being small, typically having unpredictable access patterns, and being latency sensitive, the storage node stores metadata using a different storage mechanism than files storing user data, which are typically much larger and accessed sequentially. The storage node stores metadata in a database in one of the higher tiers of storage drives, typically an NVMe SSD, and stores bulk user file data in one of the lower tiers of drives, typically capacity-optimized SSDs or HDDs. The storage node uses the highest available tier of storage drives for storing a transaction log, committing the incoming data, metadata, or operations to stable storage, therefore allowing the application to continue its processing as quickly as possible.

The PFS takes advantage of the DRAM in each storage node as a low-latency cache of the most recently read or written data and metadata. The storage node stores small component objects in capacity-optimized SSDs that provide cost-effective and high-bandwidth storage. A POSIX file of less than a threshold size, for example, less than 1.5 MB size may be fully stored on SSDs. The PFS tries to keep each SSD full above a threshold level, for example, above 80% full. If an SSD falls below that threshold level, the PFS selects the smallest component objects from the next slowest set of drives and moves them to the SSD until it is about 80% full. If the SSD is too full, PFS moves the largest component objects on the SSD to the next slower tier of drives. Every storage node performs this optimization independently and continuously. A storage node selects component objects to move by looking in its local metadata database.

Storage nodes in the PFS are object storage devices (OSDs). An object stored in an OSD is a Small Computer System Interface (SCSI) object. The PFS can be configured to create a blade set (BladeSet) for different classes of storage nodes. For example, storage nodes with a capacity of 280 TB each should not be combined into the same blade set as storage nodes with a capacity of 132 TB each. This helps to evenly spread the workload across the pool of storage nodes and avoid hotspots. According to an embodiment, the PFS supports multiple blade sets in a realm and in the same namespace at the same time.

Figure 4:
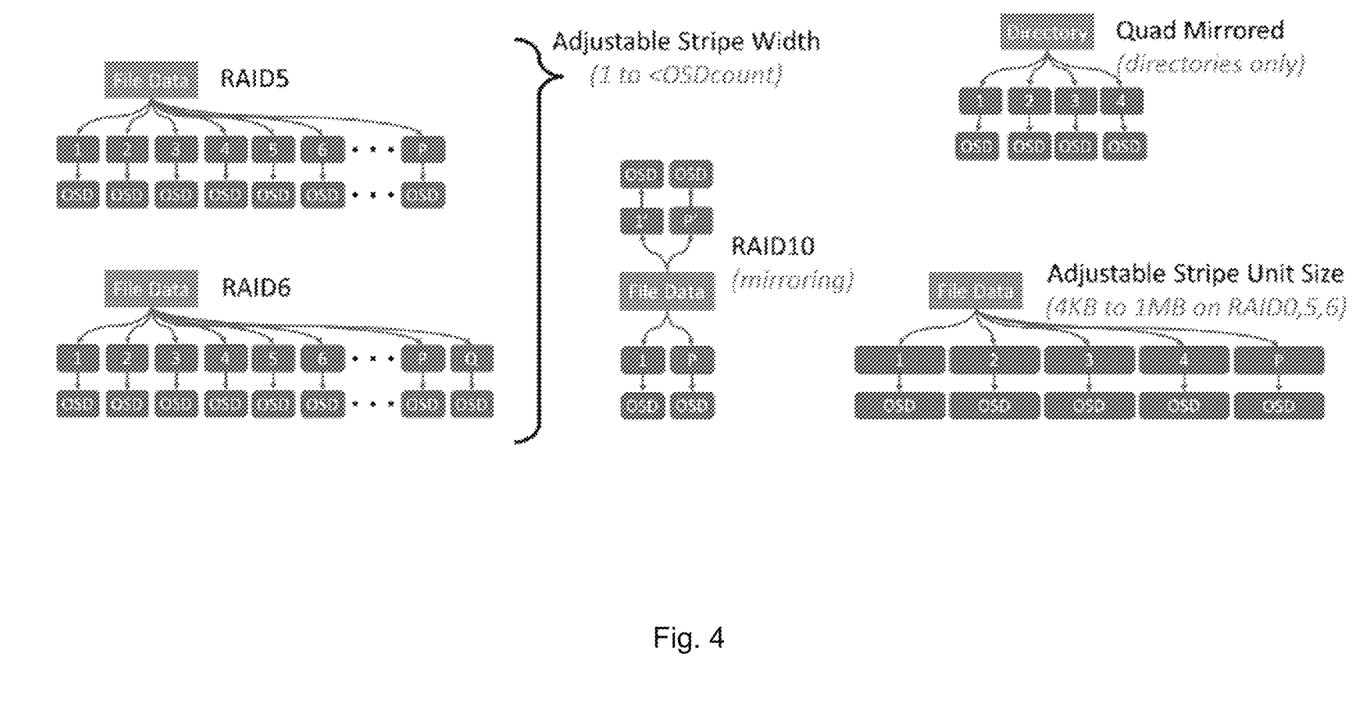
FIG. 4 shows the details of layout of a file stored in the parallel file system, according to an embodiment.

FIG. 4 shows the details of layout of a file stored in the PFS, according to an embodiment. The PFS stripes a large POSIX file across a set of component objects and adds additional component objects into that stripe that store a plurality of data protection values, for example, the P and Q data protection values of an N+2 erasure coding scheme. P data represents parity data and Q data represents Q-parity data. The PFS stores large POSIX files using erasure coding across multiple component objects, and store small POSIX files using triple-replication across three component objects. This approach delivers higher performance and makes it more space efficient. Unless the first write to a file is a large one, the PFS starts as a small file. If a small file grows into a large file, the director node transparently transitions the file to the erasure coded format at the point that the erasure coded format becomes more efficient. When a file is created, and as it grows into a large file, the director node that is managing those operations randomly assigns each of the individual component objects that make up that file to different storage nodes. No two component objects for any file are assigned to the same failure domain.

If a PFS storage node fails, the PFS reconstructs only those component objects that were on the failed storage node. This is distinct from a RAID array that would reconstruct the entire raw capacity of the storage node. The PFS reads the component objects for each affected file from all the other storage nodes and uses each file's erasure code to reconstruct the component objects that were on the failed node.

When a BladeSet in the PFS is first set up, the PFS sets aside a configurable amount of spare space on all the storage nodes in that BladeSet to hold the output from file reconstructions. When the PFS reconstructs a missing component object, it writes it to the spare space on a randomly chosen storage node in the same BladeSet. As a result, during a reconstruction the PFS uses the combined write bandwidth of all the storage nodes in that BladeSet. The increased reconstruction bandwidth reduces the total time to reconstruct the affected files, which reduces the odds of an additional failure during that time, thereby increasing the overall reliability.

The N+2 erasure coding implemented by the PFS protects against two simultaneous failures within any given BladeSet without any data loss. More than two failures in a realm are automatically and transparently recovered from, as long as there are no more than two failed storage nodes at any one time in a BladeSet.

If a third storage node were to fail in a BladeSet while two others were being reconstructed, that BladeSet would immediately transition to read-only state, as a result. Only the files in the BladeSet that had component objects on all three of the failed storage nodes would have lost data, which becomes a smaller and smaller percentage as the size of the BladeSet increases. All other files in the BladeSet are unaffected or recoverable using their erasure coding.

Since the PFS maintains a complete directory tree, it can identify the full pathnames of precisely which files need to be restored from a backup or reacquired from their original source, and can therefore also recognize which files were either unaffected or recovered using their erasure coding.

Storage System

Figure 5:
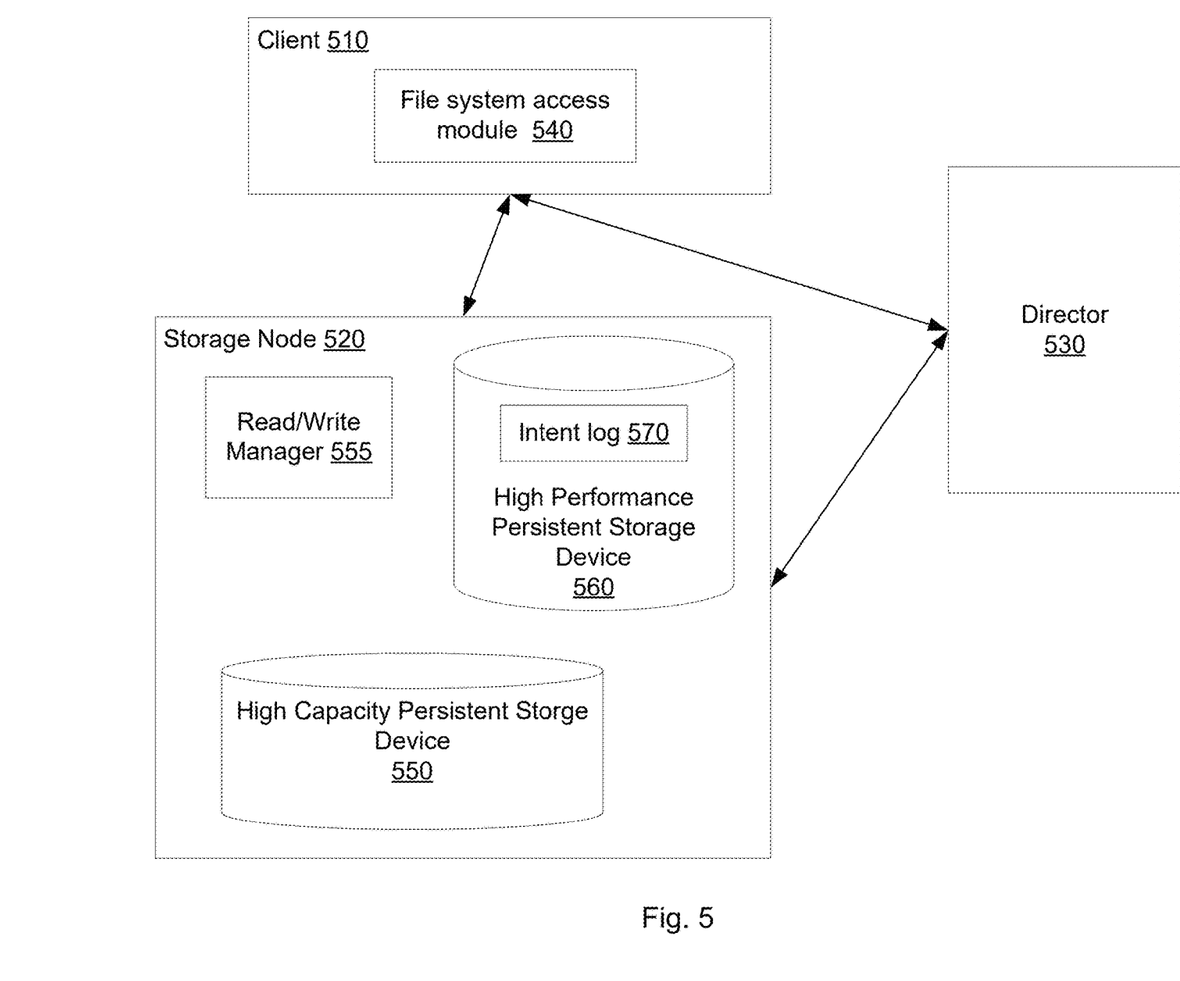
FIG. 5 shows the storage system for storing data using reduced data in intent log, according to an embodiment.

FIG. 5 shows the storage system for storing data using reduced data in intent log, according to an embodiment. The storage system comprises one or more storage nodes 520 and one or more director nodes 530. The client 510 has access to the storage nodes 520 and the director node 530. The client 510 has a file system access module 540 that is a client side library for interacting with the storage system.

The storage node 520 comprises a read/write manager 555 that manages read and write requests received from the client 510. The storage node 520 stores data in a high capacity persistent storage device 550 such as a hard disk drive (HDD). The storage nodes 520 stores an intent log 570 in a high performance persistent storage device 560. The high performance persistent storage device 560 has better performance compared to the high capacity persistent storage device 550, for example, faster speed for accessing data such as faster read and write performance. Both high performance persistent storage device 560 and high capacity persistent storage device 550 store data persistently. However, high capacity persistent storage device 550 has higher storage capacity compared to the high performance persistent storage device 560.

The intent log records the storage system's intended operations before they are actually executed. The intent log 570 improves latency of data access operations of the storage node 520. For example, without the intent log 570, a client 510 would have to wait for significant amount of time after sending a write request to wait for the write operation to complete storing the data on the high capacity persistent storage device 550. Both storage devices 550 and 560 are persistent storage devices that can retain the data even if there is no power. The data that is stored on the intent log 570 is also sent for storage on the high capacity persistent storage device 550 in parallel. The IL is write-only during normal operation and is only read back when a storage node boots. After replay, the intent log may be effectively cleared and empty, ready for new writes to be received.

The write operation performed on the high performance persistent storage device 560 is likely to complete faster than the write on the high capacity persistent storage device 550. The storage system may inform the client that sent the write request that the write request was successfully executed as soon as the data is stored in the intent log 570, even if the data is not stored on the high capacity persistent storage device 550. Since the high performance persistent storage device 560 is a persistent storage device, the intent log 570 retains data in case of power failure. The data stored on the intent log is moved to the high capacity persistent storage device 550 during normal operations or when the storage system recovers from a power failure. The process of storing the data in a persistent storage device such as the high performance persistent storage device 560 is also referred to as hardening of data. Hardening of data flushes data stored in any cache and ensures that the data is stored on persistent storage and will not be lost as a result of power failure. As a result, there is no loss of data in case of failures such as power failures. Once the data is moved from the intent log 570 to the high capacity persistent storage device 550, the read/write manager 555 deletes the data from the intent log 570 so that the intent log 570 is available for storing data for subsequent write requests.

The high performance persistent storage device 560 may be a non-volatile memory such as NVDIMM (non-volatile dual in-line memory module.) According to an embodiment, the high performance persistent storage device 560 is a solid state storage device (SSD). According to an embodiment, the high performance persistent storage device 560 is a storage device that is associated with a specification of a lifetime limit of data written. The lifetime limit of data written is also referred to as total bytes written limit or terabytes written (TBW), or write endurance, which represent specifications for a storage device such as an SSD. These measures represent an amount of data that can be written to the storage device before it is likely to fail. Accordingly, the lifetime limit of data written is a measure of durability of a storage device over its lifespan. The storge system according to an embodiment may use other equivalent metrics to represent the amount of data that can be written on storage device, for example, a drive write per day (DWPD) metric that represent the number of times a storage drive can be fully written to, per day, over its warrantied lifespan.

According to an embodiment, the client 510 uses the file system access module 540 to get permission from the director node 530 to access the storage nodes 520. Once the client has permission to access to the storage node 520 from the director node 520, the client can directly interact with the storage nodes 520 without involving the director node 530 for each interaction with the storage nodes 520.

According to an embodiment, the storage system implements a parallel file system that writes a stripe of data that is written to a plurality of storage nodes. The stripe of data may include parity data, such that in case of data loss on a storage node, parity data from other storage nodes can be used to reconstruct the lost data. The storage system may not be able to reconstruct the data if the failure occurs on more than a threshold number of storage nodes. In that situation, the storage system is able to recognize that the lost data cannot be reconstructed and as reports to the client that there is data loss.

Processes

Figure 7:
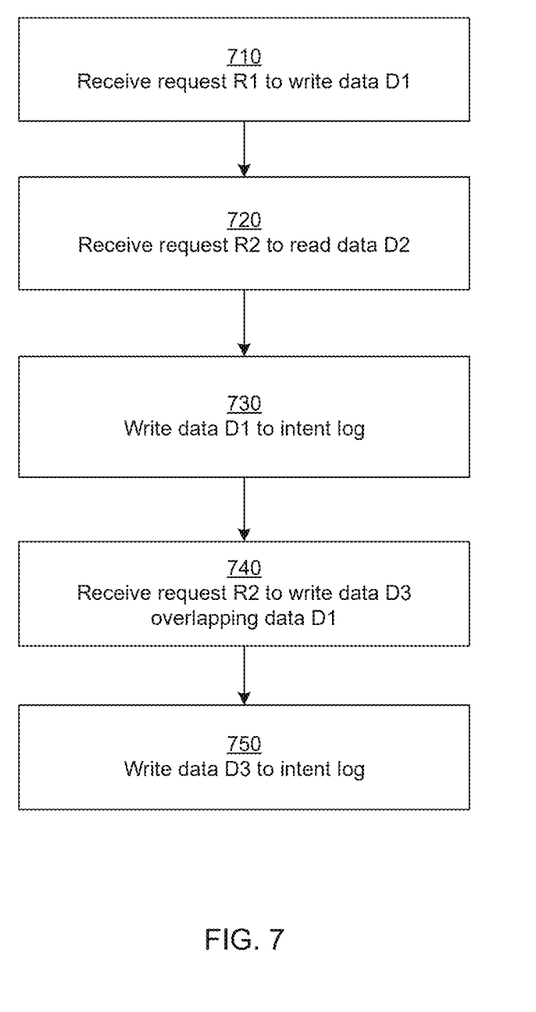
FIG. 7 is a flowchart illustrating the process of performing read and write operations, according to another embodiment.
Figure 8:
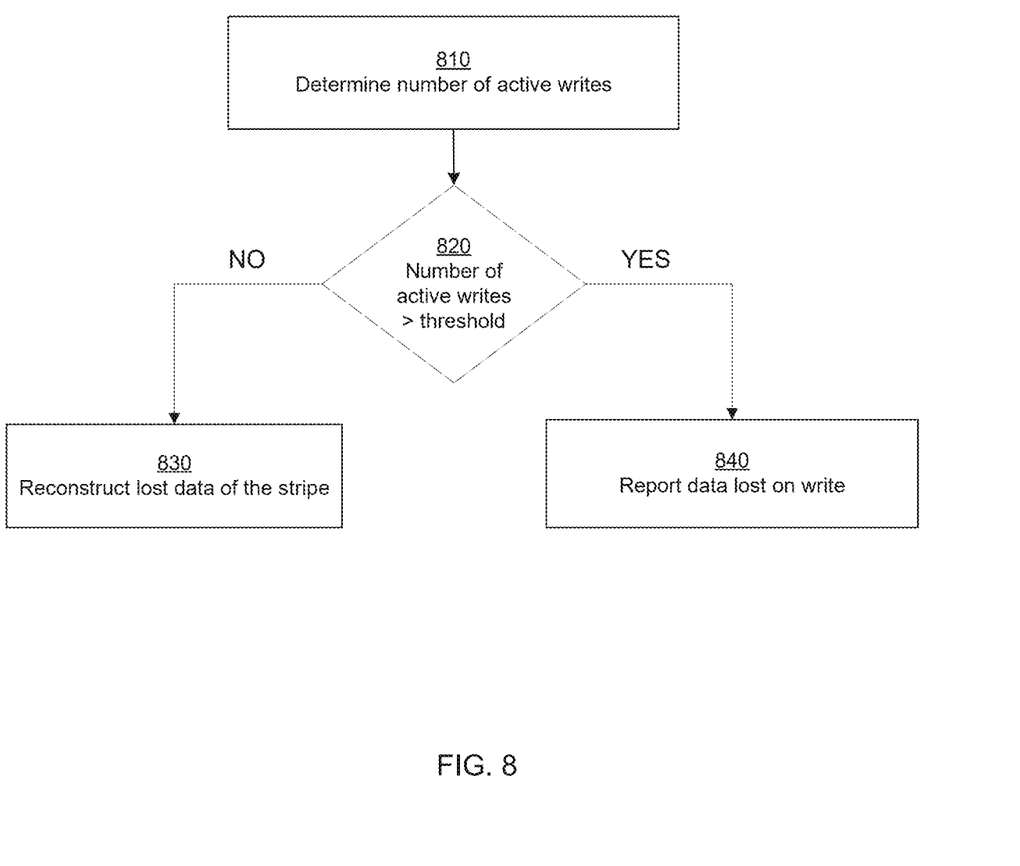
FIG. 8 is a flowchart illustrating the process of performing read and write operations for a stripe of data, according to another embodiment.

FIGS. 7-8 illustrates various processes for performing data operations such as read and write with reduced data stored in intent logs according to various embodiments. The steps may be performed by a system, for example, a storage system. The steps may be performed in an order that is different from that indicated in the corresponding figures, for example, some steps may be performed in parallel or in a different order.

Figure 6:
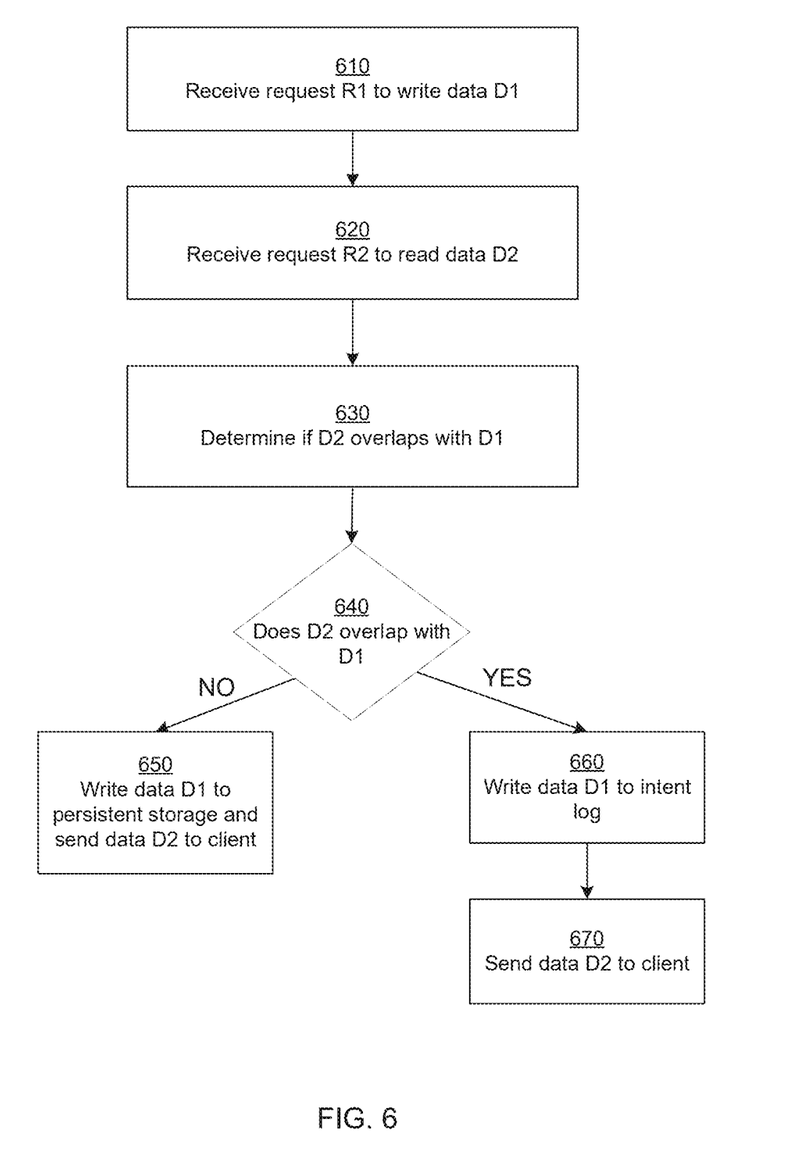
FIG. 6 is a flowchart illustrating the process of performing read and write operations, according to an embodiment.

FIG. 6 is a flowchart illustrating the process of performing read and write operations, according to an embodiment. The storage system receives a write request RW1 to write data DW1 to the storage system. The storage system does not receive any other requests that process data that overlaps the data D1 responsive to receiving the first write request, writing the first write data to the persistent storage device. The storage system receives read and write requests.

A write request may be received from a client referred to as a producer client and the read request may be received from a client referred to as a consumer client. The producer and consumer clients may be the same client. Two different clients may access the same file. For example, a producer client may write to the file and the consumer client may read from that file. The storage system monitors the situation where a portion of data of a file that is being written by a producer client is also concurrently being read by a consumer client. In this situation, the storage system writes the data to intent log so that if there is a power failure and the consumer client (or any other consumer client) reads the data, the consumer client is provided the same data that the consumer client would have received before the power failure. Since the storage system stores data on the intent log only on a small fraction of read or write operations, the amount of data that is written to the intent log is small compared to a system that writes to intent log for every read/write operation. As a result, the high performance persistent storage device 560 is expected to last longer.

FIG. 6 is a flowchart illustrating the process of performing read and write operations, according to an embodiment. If the storage system receives a request to write certain data to the storage system and does not receive any read requests that process data that overlaps the data being written, the storage system writes the data to the persistent storage device. Even though writes to the high capacity persistent storage device 550 are slow, the storage system proceeds to write the data to the high capacity persistent storage device 550 and may send an acknowledge to the client that sent the write request that the write completed after the data is written. The process shown in FIG. 6 illustrates the scenario when the system receives a request to write data and before the data is written to the high capacity persistent storage device 550, receives a read request for data that overlaps the data being written.

Accordingly, the storage system receives 610 a write request R1 for writing data D1 to the storage system. The storage system proceeds to write the data to the high capacity persistent storage device 550. Before the write operation is completed, the storage system receives 620 a request R2 to read data D2. The system determines 630 whether the data D2 overlaps with the data D1 being written. If the data D2 does not overlap with the data D1, the system continues processing the write request R1 as before by writing the data D1 to the high capacity persistent storage device 550 and also processing the read request R2 by accessing the data D2 and providing to the client requesting the data D2. If the storage system determines that the data D2 being read overlaps the data D1 being written, the system proceeds to store the data D1 in the intent log on the high performance persistent storage device 560. According to an embodiment, the system only stores the subset of the data that is being read. This ensures that the same data is returned by subsequent reads even if there is a failure. The storage system sends the data D2 to the client requesting the data after the data D1 is stored in the intent log on the high performance persistent storage device 560. The storage system continues to store the data D1 on the high capacity persistent storage device 550 and once the data D1 is stored on the high capacity persistent storage device 550, deletes the data form the intent log on the high performance persistent storage device 560.

According to an embodiment, the storage system determines in case of data overlap between concurrent read and writes, whether to save the data on the intent log or the high capacity persistent storage device 550. Accordingly, for some cases where there is a read operation that reads that that is in the process of being written, the storage system directly writes the data to the high capacity persistent storage device 550 and for other cases the storage system writes the data to the intent log, thereby further reducing the number of times the data is written to the intent log stored on the high performance persistent storage device 560. For example, if the storage system determines that the amount of data being written is large (i.e., above a threshold value) and the amount of data being read is small (i.e., below a certain threshold value), the storage system writes the data being written to the intent log stored on the high performance persistent storage device 560, or else the storage system writes the data to the high capacity persistent storage device 550. Since the amount of data being read is small, the storage system ensures that the consumer client reading the data gets the data being read fast. If the consumer client is reading a large amount of data, the consumer client is expecting the read operation to take time and therefore the delay caused by writing the data of the write request to the high capacity persistent storage device 550 is not significantly worse. Similarly if the amount of data being written is small, the storage system may simply store the data directly to the high capacity persistent storage device 550 before sending the data being rad to the consumer client.

According to some embodiments, the decision of whether the data being written is saved in intent log or the high capacity persistent storage device 550 is determined based on the type of underlying file system that save the data on the high capacity persistent storage device 550. For example, the decision for ZFS file system may be different compared to the decision made for BTRFS file system. The data being written to may be referred to as a write extent and the data being read may be referred to as the read extent. The storage system stores the ranges of read/write extents in the intent log or any other persistent storage even if the actual data being read/written is not stored in the intent log. The ranges of data is used to determine whether there is an overlap between data being read/written. According to an embodiment, the storage system stores the write data to a different SSD store (e.g., an SSD store of ZFS that stores ZIL or ZFS intent log) than the SSD store of intent log, in case the write data is small or both he write data and the read data are large. According to an embodiment, for certain file systems, for example, BTRFS, the storage system writes the write data to the intent log on the high performance persistent storage device 560 whenever there is an overlap of data being written with data being read concurrently, independent of the sizes of the data being written or read. In general the storage system ensures that the write data is persisted in some persistent storage if there is a concurrent read that is reading data that overlaps with the data being written.

According to an embodiment, the storage system comprises a plurality of storage nodes, each storage node having a persistent storage device for storing data and a high performance persistent storage device for storing intent log. The write data received with a write request is a portion of a stripe of data being written to the plurality of storage nodes. A portion of the stripe of data is stored in each storage node. One or more portions of the stripe of data may represent parity data that can be used to reconstruct data in case of loss of data. The following table illustrates a 4+1 stripe of data including for data extents D0, D1, D2, D3, and one parity extent P. The write in step 1 causes all data extents to become dirty. The read request in step 2 reads only D3 and the above process is followed to harden the data, i.e., save it in persistent store high performance persistent storage device 560 or high capacity persistent storage device 550. If a power failure occurs and recovery is performed in step 3, only data D3 is new, the remaining extents have stale data.

| Step | D0 | D1 | D2 | D3 | P |
|---|---|---|---|---|---|
| Step 1: Write request | Dirty | Dirty | Dirty | Dirty | Dirty |
| Step 2: Read D3 and harden | Dirty | Dirty | Dirty | Harden | Dirty |
| Step 4: Recover after power failure | Stale | Stale | Stale | New | Stale |

To overcome the possibility of the above scenario, according to an embodiment, the storage node sends instructions to other storage nodes to write corresponding subset of data of the stripe of data being written to their corresponding intent logs (or corresponding high capacity persistent storage device 550). Accordingly, when the data extent of a storage node is being hardened as a result of the process shown in FIG. 6, the storage system ensures that all data extents of the stripe are hardened.

According to an embodiment, the storage system receives a write request and a read request concurrently with data overlap. The storage system further receives another write request that overlaps the data of the write request before the read and the write requests have been processed. In this situation the storage system may write the write data of the new write request to the intent log stored in the high performance persistent storage device 560. Alternatively, the storage system may write the data of the new write request to the high capacity persistent storage device 550 and invalidate the data in the intent log stored in the high performance persistent storage device 560.

FIG. 7 is a flowchart illustrating the process of performing read and write operations, according to another embodiment. The steps 710, 720, and 730 are similar to steps 610, 620, and 660 of the flowchart illustrated in FIG. 6. Accordingly, the storage system receives 710 a read request R1 to write data D1. The system also receives 720 a request R2 to read data D2 that overlaps with data D1. The system proceeds to write 730 the data D1 to the intent log. Subsequently before the write operation R1 is completed, the storage system also receives 740 another request R3 to write data D3 that overlaps with data D1 that was previously being written. In this situation, the storage system writes 750 the data D3 also in the intent log on the high performance persistent storage device 560 even if there is no read request with overlapping data. This is so because the data D3 overlaps with data D1 which is stored in intent log. The storage system avoids inconsistencies in the data stored on both the high capacity persistent storage device 550 and the high performance persistent storage device 560.

According to an embodiment, the storage system stores information identifying each storage node associated with the second write request, whether or not the storage system is able to store the data being written or not. If the storage system detects a failure of a storage node of the storage system, the storage system determines a count of storage nodes that have an active write. A storage node is determined to have an active write if the storage node was identified as being associated with the write request but failed to store data of the second write request. The storage system determines whether to reconstruct the data of each storage node with an active write based on the count of storage nodes that lost data. The storge system determines that the lost data can be reconstructed depending on the parity data. Depending on the size of parity data that is stored, the system may be able to reconstruct the lost data. However, of the number of storage nodes with active writs is more than a threshold number that the parity data can handle, the storage system determines that the lost data cannot be reconstructed and sends an error message.

FIG. 8 is a flowchart illustrating the process of performing read and write operations for a stripe of data, according to another embodiment. The storage system determines 810 the number of active writes. If the storage system determines that the number of active writes is above a threshold value determined based on the parity data, the storage system reports data that we received as part of the write request is lost. If the storage system determines that the number of active writes is below a threshold value determined based on the parity data, the storage system reconstructs the lost data using the parity data.

Accordingly, if the count of storage nodes with active writes is below a threshold value, the storage system reconstructs the data of storage nodes that lost data based on parity data stored in other storage nodes of the storage system. If the count of storage nodes with active writes above a threshold value, the storage system sends an error message indicating loss of second write data being written in the second write request.

Figure 9:
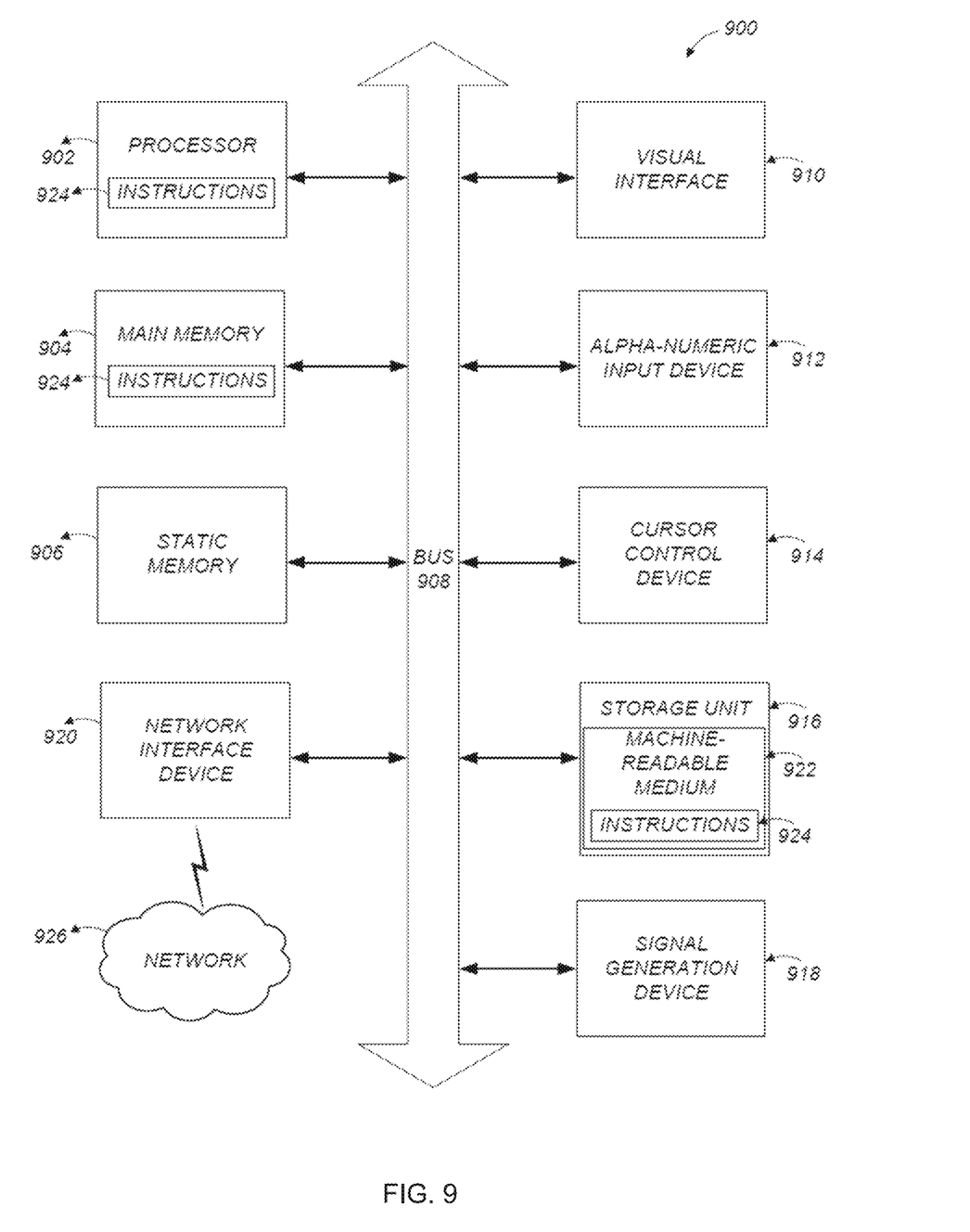
FIG. 9 is a block diagram illustrating components of an example machine able to read instructions from a machine-readable medium and execute them in a processor (or controller).

FIG. 9 is a block diagram illustrating components of an example machine able to read instructions from a machine-readable medium and execute them in a processor (or controller). Specifically, FIG. 9 shows a diagrammatic representation of a machine in the example form of a computer system 900 within which program code (e.g., software) for causing the machine to perform any one or more of the methodologies discussed herein may be executed. The program code may be comprised of instructions 924 executable by one or more processors 902. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a computing system capable of executing instructions 924 (sequential or otherwise) that specify actions to be taken by that machine. Further, while only a single machine is illustrated, the term "machine" shall also be taken to include any collection of machines that individually or jointly execute instructions 924 to perform any one or more of the methodologies discussed herein.

The example computer system 900 includes one or more processors 902 (e.g., a central processing unit (CPU), a graphics processing unit (GPU), a digital signal processor (DSP), one or more application specific integrated circuits (ASICs), one or more radio-frequency integrated circuits (RFICs), field programmable gate arrays (FPGAs)), a main memory 904, and a static memory 906, which are configured to communicate with each other via a bus 908. The computer system 900 may further include visual display interface 910. The visual interface may include a software driver that enables (or provide) user interfaces to render on a screen either directly or indirectly. The visual interface 910 may interface with a touch enabled screen. The computer system 900 may also include input devices 912 (e.g., a keyboard a mouse), a cursor control device 914, a storage unit 916, a signal generation device 918 (e.g., a microphone and/or speaker), and a network interface device 920, which also are configured to communicate via the bus 908.

The storage unit 916 includes a machine-readable medium 922 (e.g., magnetic disk or solid-state memory) on which is stored instructions 924 (e.g., software) embodying any one or more of the methodologies or functions described herein. The instructions 924 (e.g., software) may also reside, completely or at least partially, within the main memory 904 or within the processor 902 (e.g., within a processor's cache memory) during execution.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A computer-implemented method, comprising:
   receiving, by a storage system, a first write request to write a first write data, the storage system storing data on a persistent storage device and storing intent log on a high performance persistent storage device with faster performance compared to the persistent storage device, wherein the high performance persistent storage device has a lifetime limit of total bytes written;
   responsive to receiving the first write request, writing the first write data to the persistent storage device;
   receiving, by the storage system, a second write request to write a second write data;
   receiving a read request for a read data before the second write data is stored on the persistent storage device;
   determining whether the read data overlaps the second write data;
   responsive to determining that the read data overlaps the second write data, storing the second write data in the intent log stored on the high performance persistent storage device;
   responsive to storing the second write data in the intent log on the high performance persistent storage device, sending the read data in response to the read request; and
   moving the second write data from the intent log on the high performance persistent storage device to the persistent storage device.

2. The computer-implemented method of claim 1, wherein the storage system comprises a plurality of storage nodes, each storage node having a persistent storage device for storing data and a high performance persistent storage device for storing intent log, wherein the second write data is a portion of a stripe of data being written to the plurality of storage nodes, wherein at least a portion of the stripe of data is stored in each storage node, wherein one or more portions of the stripe of data comprise parity data.

3. The computer-implemented method of claim 2, further comprising:
   sending instructions to one or more storage nodes of the plurality of storage nodes to write corresponding subset of data to the intent log of each of the one or more storage nodes.

4. The computer-implemented method of claim 2, further comprising:
   storing information identifying each storage node associated with the second write request; and
   responsive to a failure of a storage node from the plurality of storage nodes:
      determining a count of storage nodes that lost data, wherein a storage node is determined to have lost data if the storage node was identified as being associated with the second write request but failed to store data of the second write request; and
      determining whether to reconstruct the data of each storage node that lost data based on the count of storage nodes that lost data.

5. The computer-implemented method of claim 4, further comprising:
   responsive to the count of storage nodes that lost data being below a threshold value, reconstructing data of storage nodes that lost data based on parity data stored in other storage nodes of the plurality of storage nodes.

6. The computer-implemented method of claim 4, further comprising:
   responsive to the count of storage nodes that lost data being above a threshold value sending an error message indicating loss of second write data being written in the second write request.

7. The computer-implemented method of claim 1, further comprising:
   receiving a third write request for a third write data that overlaps second write data; and
   responsive to receiving the third write request, writing the third write data to the intent log stored in the high performance persistent storage device.

8. The computer-implemented method of claim 1, further comprising:
   receiving a third write request for a third write data that overlaps second write data; and
   responsive to receiving the third write request, writing the third write data to the persistent storage device and invalidating the data in the intent log stored in the high performance persistent storage device.

9. The computer-implemented method of claim 1, wherein the persistent storage device is a hard disk drive and the high performance persistent storage device is a solid state device.

10. A non-transitory computer readable storage medium storing instructions that when executed by one or more computer processors, cause the one or more computer processors to perform steps comprising:
  receiving, by a storage system, a first write request to write a first write data, the storage system storing data on a persistent storage device and storing intent log on a high performance persistent storage device with faster performance compared to the persistent storage device, wherein the high performance persistent storage device has a lifetime limit of total bytes written;
  responsive to receiving the first write request, writing the first write data to the persistent storage device;
  receiving, by the storage system, a second write request to write a second write data;
  receiving a read request for a read data before the second write data is stored on the persistent storage device;
  determining whether the read data overlaps the second write data;
  responsive to determining that the read data overlaps the second write data, storing the second write data in the intent log stored on the high performance persistent storage device;
  responsive to storing the second write data in the intent log on the high performance persistent storage device, sending the read data in response to the read request; and
  moving the second write data from the intent log on the high performance persistent storage device to the persistent storage device.

11. The non-transitory computer readable storage medium of claim 10, wherein the storage system comprises a plurality of storage nodes, each storage node having a persistent storage device for storing data and a high performance persistent storage device for storing intent log, wherein the second write data is a portion of a stripe of data being written to the plurality of storage nodes, wherein at least a portion of the stripe of data is stored in each storage node, wherein one or more portions of the stripe of data comprise parity data.

12. The non-transitory computer readable storage medium of claim 11, wherein the instructions further cause the one or more computer processors to perform steps comprising:
  sending instructions to one or more storage nodes of the plurality of storage nodes to write corresponding subset of data to the intent log of each of the one or more storage nodes.

13. The non-transitory computer readable storage medium of claim 11, wherein the instructions further cause the one or more computer processors to perform steps comprising:
  storing information identifying each storage node associated with the second write request; and
  responsive to a failure of a storage node from the plurality of storage nodes:
    determining a count of storage nodes that lost data, wherein a storage node is determined to have lost data if the storage node was identified as being associated with the second write request but failed to store data of the second write request; and
    determining whether to reconstruct the data of each storage node that lost data based on the count of storage nodes that lost data.

14. The non-transitory computer readable storage medium of claim 13, wherein the instructions further cause the one or more computer processors to perform steps comprising:
  responsive to the count of storage nodes that lost data being below a threshold value, reconstructing data of storage nodes that lost data based on parity data stored in other storage nodes of the plurality of storage nodes.

15. The non-transitory computer readable storage medium of claim 13, wherein the instructions further cause the one or more computer processors to perform steps comprising:
  responsive to the count of storage nodes that lost data being above a threshold value sending an error message indicating loss of second write data being written in the second write request.

16. The non-transitory computer readable storage medium of claim 10, wherein the instructions further cause the one or more computer processors to perform steps comprising:
  receiving a third write request for a third write data that overlaps second write data; and
  responsive to receiving the third write request, writing the third write data to the intent log stored in the high performance persistent storage device.

17. The non-transitory computer readable storage medium of claim 10, wherein the instructions further cause the one or more computer processors to perform steps comprising:
  receiving a third write request for a third write data that overlaps second write data; and
  responsive to receiving the third write request, writing the third write data to the persistent storage device and invalidating the data in the intent log stored in the high performance persistent storage device.

18. A computer system comprising:
  one or more computer processors; and
  a non-transitory computer readable storage medium storing instructions that when executed by the one or more computer processors, cause the one or more computer processors to perform steps comprising:
    receiving, by a storage system, a first write request to write a first write data, the storage system storing data on a persistent storage device and storing intent log on a high performance persistent storage device with faster performance compared to the persistent storage device, wherein the high performance persistent storage device has a lifetime limit of total bytes written;
    responsive to receiving the first write request, writing the first write data to the persistent storage device;
    receiving, by the storage system, a second write request to write a second write data;
    receiving a read request for a read data before the second write data is stored on the persistent storage device;
    determining whether the read data overlaps the second write data;
    responsive to determining that the read data overlaps the second write data, storing the second write data in the intent log stored on the high performance persistent storage device;
    responsive to storing the second write data in the intent log on the high performance persistent storage device, sending the read data in response to the read request; and
    moving the second write data from the intent log on the high performance persistent storage device to the persistent storage device.

19. The computer system of claim 18, wherein the storage system comprises a plurality of storage nodes, each storage node having a persistent storage device for storing data and a high performance persistent storage device for storing intent log, wherein the second write data is a portion of a stripe of data being written to the plurality of storage nodes, wherein at least a portion of the stripe of data is stored in each storage node, wherein one or more portions of the stripe of data comprise parity data, wherein the instructions further cause the one or more computer processors to perform steps comprising:

sending instructions to one or more storage nodes of the plurality of storage nodes to write corresponding subset of data to the intent log of each of the one or more storage nodes.

20. The computer system of claim 19, wherein the instructions further cause the one or more computer processors to perform steps comprising:

storing information identifying each storage node associated with the second write request; and     responsive to a failure of a storage node from the plurality of storage nodes:

determining a count of storage nodes that lost data, wherein a storage node is determined to have lost data if the storage node was identified as being associated with the second write request but failed to store data of the second write request; and         determining whether to reconstruct the data of each storage node that lost data based on the count of storage nodes that lost data.

* * * * *